United States Patent
Hayashi et al.

(10) Patent No.: US 12,214,316 B2
(45) Date of Patent: Feb. 4, 2025

(54) METHOD FOR MANUFACTURING HOLLOW FIBER MEMBRANE MODULE, AND HOLLOW FIBER MEMBRANE MODULE

(71) Applicant: SUMITOMO ELECTRIC FINE POLYMER, INC., Osaka (JP)

(72) Inventors: Fumihiro Hayashi, Osaka (JP); Yasuhiko Muroya, Osaka (JP); Takamasa Hashimoto, Osaka (JP); Yoshimasa Suzuki, Osaka (JP)

(73) Assignee: SUMITOMO ELECTRIC FINE POLYMER, INC., Osaka (JP)

( * ) Notice: Subject to any disclaimer, the term of this patent is extended or adjusted under 35 U.S.C. 154(b) by 422 days.

(21) Appl. No.: 17/756,933

(22) PCT Filed: Aug. 17, 2020

(86) PCT No.: PCT/JP2020/031005
§ 371 (c)(1),
(2) Date: Jun. 6, 2022

(87) PCT Pub. No.: WO2021/131145
PCT Pub. Date: Jul. 1, 2021

(65) Prior Publication Data
US 2023/0025394 A1    Jan. 26, 2023

(30) Foreign Application Priority Data
Dec. 25, 2019  (JP) ................ 2019-235301

(51) Int. Cl.
*B01D 63/02* (2006.01)
*B01D 67/00* (2006.01)
*B01D 69/08* (2006.01)

(52) U.S. Cl.
CPC ..... *B01D 63/0231* (2022.08); *B01D 63/0233* (2022.08); *B01D 63/024* (2013.01); *B01D 67/0086* (2013.01); *B01D 69/08* (2013.01)

(58) Field of Classification Search
CPC ........... B01D 63/0231; B01D 63/0233; B01D 63/024; B01D 2313/14; B01D 63/0232;
(Continued)

(56) References Cited

U.S. PATENT DOCUMENTS 6,103,117 A * 8/2000 Shimagaki ......... B01D 63/0233
264/211.13
6,331,248 B1   12/2001 Taniguchi et al.
(Continued)

FOREIGN PATENT DOCUMENTS

JP    S62-155852 U   10/1987
JP    S63-168003 U   11/1988
(Continued)

OTHER PUBLICATIONS

Yingqi Ye, "Industrial Water Treatment Technology", Second Edition, p. 329, Shanghai Science Popularization Press (Sep. 2004).
(Continued)

*Primary Examiner* — Joseph W Drodge
(74) *Attorney, Agent, or Firm* — IPUSA, PLLC

(57) ABSTRACT

A method for manufacturing a hollow fiber membrane module, the hollow fiber membrane module including: a hollow fiber membrane bundle including a plurality of hollow fiber membranes; a housing configured to contain the hollow fiber membrane bundle; and a potting part in which a potting agent is added between an outer surface of the hollow fiber membranes and an inner surface of the housing at both end regions or at one end region of the hollow fiber membrane bundle, wherein the method including: providing a sheet-shaped spacer in a space between the hollow fiber
(Continued)

membranes at the both end regions or at the one end region of the hollow fiber membrane bundle; and adding a potting agent between the outer surface of the hollow fiber membranes and the inner surface of the housing at the both end regions or at the one end region of the hollow fiber membrane bundle such that the provided spacer is embedded, wherein the potting agent includes resin, rubber, or elastomer, as a main ingredient, and wherein the spacer is a net, a non-woven fabric, a porous sheet, or a film.

5 Claims, 4 Drawing Sheets

(58) Field of Classification Search
CPC ............ B01D 63/069; B01D 2313/042; B01D 2313/0614; B01D 2313/143; B01D 2313/146; B01D 2313/21; B01D 67/0081; B01D 67/0086; B01D 69/08
See application file for complete search history.

(56) References Cited

U.S. PATENT DOCUMENTS

| | | | | |
|---|---|---|---|---|
| 2005/0161389 | A1* | 7/2005 | Takeda | B01D 63/043 210/321.75 |
| 2013/0043187 | A1* | 2/2013 | Adams | B01D 63/043 210/321.89 |
| 2013/0306545 | A1* | 11/2013 | Shinohara | B01D 63/021 210/321.89 |
| 2015/0217235 | A1* | 8/2015 | Yamaoka | B01D 63/0221 96/8 |
| 2015/0298064 | A1* | 10/2015 | Takagi | B01D 69/1216 210/488 |
| 2016/0151744 | A1* | 6/2016 | Visser | B01D 63/04 210/321.89 |

FOREIGN PATENT DOCUMENTS

| | | |
|---|---|---|
| JP | H10-118464 | 5/1998 |
| JP | 2000-189761 | 7/2000 |
| JP | 2005-230814 | 9/2005 |
| JP | 2012-045453 | 3/2012 |
| WO | 1997/10893 | 3/1997 |
| WO | 2014/024961 | 2/2014 |

OTHER PUBLICATIONS

Jun Shi, et al., "Membrane Technology Handbook", p. 526, 563-564, Chemical Industry Press, Beijing (Jan. 2001).

Haile Ma, "Food Machinery and Equipment", p. 131, China Agriculture Press, Beijing (Jan. 2004).

* cited by examiner

METHOD FOR MANUFACTURING HOLLOW FIBER MEMBRANE MODULE, AND HOLLOW FIBER MEMBRANE MODULE

TECHNICAL FIELD

The present invention relates to a method for manufacturing hollow fiber membrane module, and hollow fiber membrane module.

The present application claims priority to Japanese Patent Application No. 2019-235301, filed Dec. 25, 2019, with the Japanese Patent Office. The contents of which are incorporated herein by reference in their entirety.

BACKGROUND ART

A hollow fiber membrane module that removes gases such as oxygen dissolved in a liquid is used in semiconductor manufacturing processes, printers, liquid crystal encapsulation processes, chemical liquid manufacturing processes, and the like. The hollow fiber membrane module is modularized by accommodating a plurality of hollow fiber membranes in a housing provided with a liquid inlet and a liquid outlet in a bundled state. In a modularization process of the hollow fiber membrane module, a bundle of multiple hollow fiber membranes is contained within a housing, and a potting agent is added in a space between each hollow fiber membrane at the end of the bundle of the hollow fiber membranes and between the hollow fiber membrane and the housing to perform adhesive fixing (potting), thereby forming a potting part. The space between the liquid inlet and the liquid outlet of the module is sealed, and the hollow fiber membranes are bound to each other by the potting part.

In a filtration or separation operation using the hollow fiber membrane module, because the process is performed under pressure conditions, the potting agent is required to have high adhesiveness between each of the hollow fiber membranes and between the hollow fiber membrane and the housing. In the related art, a hollow fiber membrane module is proposed in which, by immersing at least one end region of the bundle of the hollow fiber membranes in a molten material of a mixture consisting of a polyolefin resin and petroleum wax and cooling and solidifying the molten material, the housing of the module and the hollow fiber membranes are fixed in a highly sealed and adhered state (see Japanese Laid-Open Patent Publication No. H10-118464).

CITATION LIST

Patent Literature

PTL 1
   Japanese Laid-Open Patent Publication No. H10-118464

SUMMARY OF INVENTION

According to one aspect of the present invention, a method for manufacturing a hollow fiber membrane module, the hollow fiber membrane module includes: a hollow fiber membrane bundle including a plurality of hollow fiber membranes; a housing configured to contain the hollow fiber membrane bundle; and a potting part in which a potting agent is added between an outer surface of the hollow fiber membranes and an inner surface of the housing at both end regions or at one end region of the hollow fiber membrane bundle, wherein the method including: providing a sheet-shaped spacer in a space between the hollow fiber membranes at the both end regions or at the one end region of the hollow fiber membrane bundle; and adding a potting agent between the outer surface of the hollow fiber membranes and the inner surface of the housing at the both end regions or at the one end region of the hollow fiber membrane bundle such that the provided spacer is embedded, wherein the potting agent includes resin, rubber, or elastomer, as a main ingredient, and wherein the spacer is a net, a non-woven fabric, a porous sheet, or a film.

According to another aspect of the present invention, a hollow fiber membrane bundle including a plurality of hollow fiber membranes; a housing configured to contain the hollow fiber membrane bundle; a potting part in which a potting agent is added between an outer surface of the hollow fiber membranes and an inner surface of the housing at both end regions or at one end region of the hollow fiber membrane bundle; and a sheet-shaped spacer provided in a space between the hollow fiber membranes at the both end regions or at the one end region of the hollow fiber membrane bundle, wherein the potting agent includes resin, rubber, or elastomer, as a main ingredient, and wherein the spacer is a net, a non-woven fabric, a porous sheet, or a film.

DESCRIPTION OF EMBODIMENTS

Technical Problem

Figure 1:
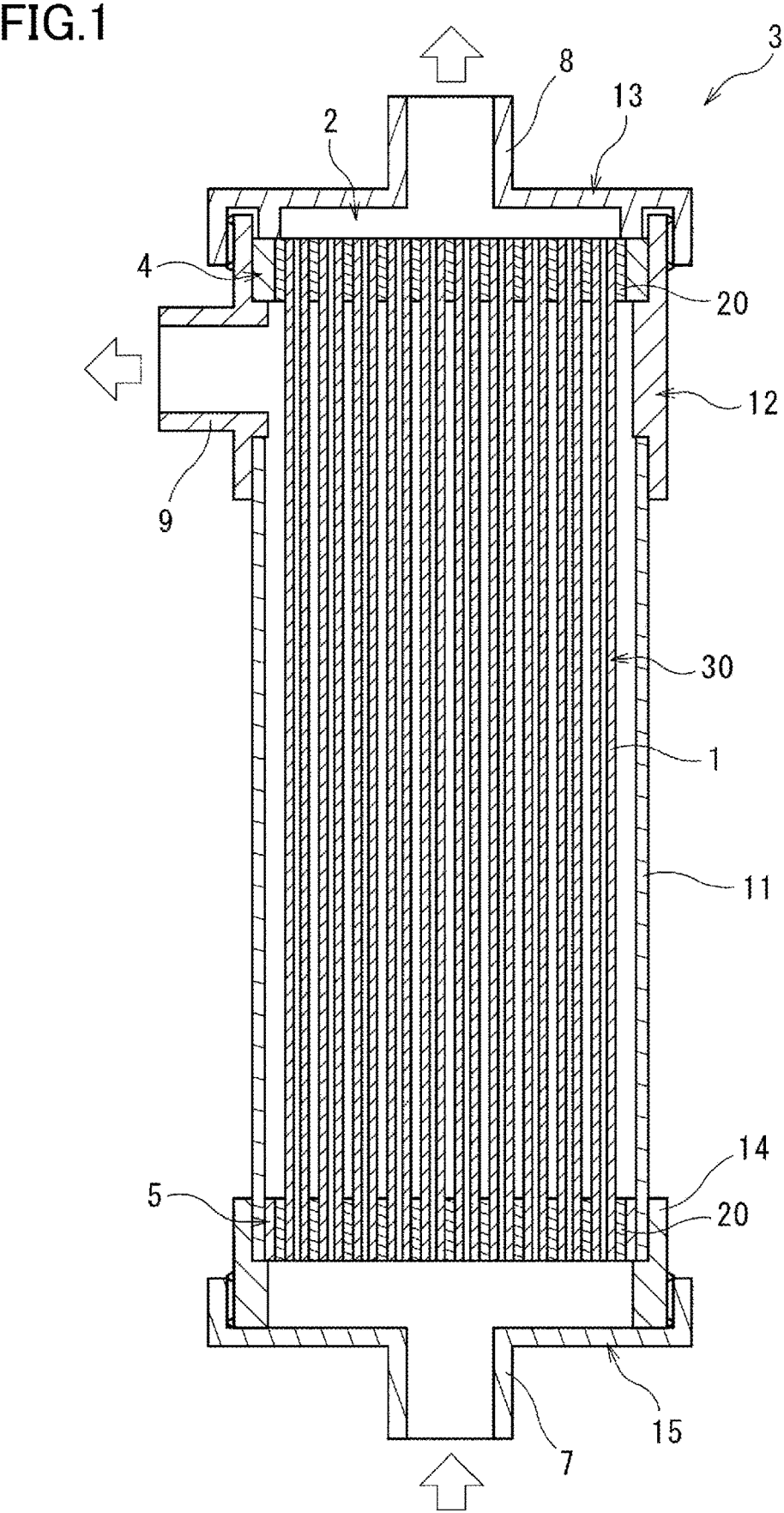
FIG. 1 is a schematic longitudinal sectional view illustrating a hollow fiber membrane module according to the first embodiment.

As described above, the potting part is formed by immersing the end region of the hollow fiber membrane bundle in a molten material of a resin composition and the like which serves as a potting agent and cooling and solidifying the molten material. Examples of a means for adding the potting agent into the space between the hollow fiber membranes of the hollow fiber membrane bundle include: a method in which a hollow fiber membrane bundle is inserted into a plate made of the resin composition having holes at regular intervals and fixed, and then the plate is melted and adhesively sealed; and a method in which a molten material of a resin composition and the like is flowed into the end region of the hollow fiber membrane bundle. However, in the case where the plate is melted, the process of inserting the hollow fiber membrane bundle into the plate takes time, and the potting agent may not sufficiently spread in the space between the hollow fiber membranes of the hollow fiber membrane bundle. In the case where a molten material of a resin composition and the like is flowed into the end region of the hollow fiber membrane bundle, in order for the potting agent to be sufficiently spread in the space between the hollow fiber membranes, only a thick hollow fiber membrane with elasticity is preferred. Accordingly, there is a need for a hollow fiber membrane module in which the hollow fiber membranes can be filled to a high density and more reliably adhered by the potting agent, thereby preventing leakage.

The present disclosure is based on such circumstances and is intended to provide a method for manufacturing a hollow fiber membrane module having excellent adhesiveness of hollow fiber membranes filled to a high density and an excellent leakage-preventing effect.

Effects of Present Disclosure

According to the present disclosure, a method for manufacturing a hollow fiber membrane module having excellent adhesiveness of hollow fiber membranes filled to a high density and an excellent leakage-preventing effect, can be provided.

DESCRIPTION OF EMBODIMENTS OF PRESENT DISCLOSURE

First, embodiments of the present disclosure will be listed and described.

A method for manufacturing a hollow fiber membrane module according to one aspect of the present disclosure is a method for manufacturing a hollow fiber membrane module, the hollow fiber membrane module including: a hollow fiber membrane bundle including a plurality of hollow fiber membranes; a housing configured to contain the hollow fiber membrane bundle; and a potting part in which a potting agent is added between an outer surface of the hollow fiber membranes and an inner surface of the housing at both end regions or at one end region of the hollow fiber membrane bundle. The method for manufacturing a hollow fiber membrane module includes: providing a sheet-shaped spacer in a space between the hollow fiber membranes at both end regions or at one end region of the hollow fiber membrane bundle; and adding a potting agent between the outer surface of the hollow fiber membranes and the inner surface of the housing at both end regions or at one end region of the hollow fiber membrane bundle such that the provided spacer is embedded. The potting agent Includes resin, rubber, or elastomer, as a main ingredient. The spacer is a net, a non-woven fabric, a porous sheet, or a film.

According to the method for manufacturing a hollow fiber membrane module, the sheet-shaped spacer is provided in the space between the hollow fiber membranes at both end regions or at one end region of the hollow fiber membrane bundle. The potting agent is then added between the outer surface of the hollow fiber membranes and the inner surface of the housing at both end regions or at one end region of the hollow fiber membrane bundle such that the provided spacer is embedded. Because the spacer is a net, a non-woven fabric, a porous sheet, or a film, the potting agent can easily flow along the spacer. Accordingly, the adhesiveness of the hollow fiber membranes and the leakage-preventing effect of the hollow fiber membrane module can be further improved. Therefore, by the method for manufacturing a hollow fiber membrane module, a hollow fiber membrane module having excellent adhesiveness of hollow fiber membranes filled to a high density and an excellent leakage-preventing effect, can be produced. The term "embedded" means that the spacer is surrounded by the potting agent.

Herein, the term "main ingredient" means the ingredient having the largest content rate in terms of mass, for example, an ingredient having a content rate of 50% by mass or more, preferably 70% by mass or more, and more preferably 95% by mass or more.

In the method for manufacturing the hollow fiber membrane module, preferably, the spacer is band-formed, and the process of providing includes: arranging a plurality of hollow fiber membranes in parallel while holding only the both end regions or the one end region of the hollow fiber membranes on one side of the spacer; and forming a roll-shaped hollow fiber membrane bundle by rolling the hollow fiber membranes and the spacer that is provided at the both end regions or the one end region of the hollow fiber membranes. In the method for manufacturing the hollow fiber membrane module, the end regions of the hollow fiber membranes are adhered in parallel on one side of the spacer, and a roll-shaped hollow fiber membrane bundle is formed by rolling the hollow fiber membranes and the spacer that which is provided at both end regions or at one end region of the hollow fiber membranes. Accordingly, because the spacer having good wettability with the potting agent is inserted into the roll-shaped hollow fiber membrane bundle, the potting agent can be sufficiently spread in the space between the hollow fiber membranes of the hollow fiber membrane bundle by capillary action of the spacer. Therefore, by the method for manufacturing the hollow fiber membrane module, a hollow fiber membrane module having excellent adhesiveness of hollow fiber membranes filled to a high density and an excellent leakage-preventing effect, can be produced.

According to another aspect of the present disclosure, a hollow fiber membrane module includes: a hollow fiber membrane bundle including a plurality of hollow fiber membranes; a housing configured to contain the hollow fiber membrane bundle; a potting part in which a potting agent is added between an outer surface of the hollow fiber membranes and an inner surface of the housing at both end regions or at one end region of the hollow fiber membrane bundle; and a sheet-shaped spacer provided in a space between the hollow fiber membranes at the both end regions or at the one end region of the hollow fiber membrane bundle. The potting agent includes resin, rubber, or elastomer, as a main ingredient. The spacer is a net, a non-woven fabric, a porous sheet, or a film. The spacer is embedded in the potting part.

The hollow fiber membrane module is provided with the potting part in which the potting agent is added between the outer surface of the hollow fiber membranes and the inner surface of the housing at both end regions or at one end region of the hollow fiber membrane bundle, and the sheet-shaped spacer is embedded in the potting part. Because the spacer is a net, a non-woven fabric, a porous sheet, or a film, the potting agent can easily flow along the spacer. Accordingly, the adhesiveness of the hollow fiber membranes and the leakage-preventing effect of the hollow fiber membrane module can be further improved. Therefore, the hollow fiber membrane module exhibits high leakage-preventing effect of a solution to be processed, and has excellent adhesiveness of hollow fiber membranes filled to a high density and an excellent leakage-preventing effect.

In the hollow fiber membrane module, it is preferable that the ratio of the thickness of the spacer to the average outer diameter of the hollow fiber membrane is 0.1 or more and 1.0 or less. In the hollow fiber membrane module, when the ratio of the thickness of the spacer to the average outer diameter of the hollow fiber membrane is within the range described above, the wettability of the spacer with the potting agent can be further improved. Therefore, the adhesiveness of the hollow fiber membranes and the leakage-preventing effect in the hollow fiber membrane module can be further improved.

It is preferable that the surface free energy of the spacer is 30 mJ/m² or more and 50 mJ/m² or less. When the surface free energy of the spacer is 30 mJ/m² or more and 50 mJ/m² or less, the spacer has good wettability with a potting agent containing a resin, rubber, or an elastomer, as a main component. Accordingly, a spacer having good wettability with the potting agent is embedded in the potting part in which the potting agent is added between the outer surface of the hollow fiber membranes and the inner surface of the housing at both end regions or at one end region of the hollow fiber membrane bundle. Therefore, the potting agent can be sufficiently spread in the space between the hollow fiber membranes of the hollow fiber membrane bundle by capillary action of the spacer.

In the hollow fiber membrane module, it is preferable that the spacer includes polyolefin, polyurethane, polyethersulfone, polyvinyl alcohol, cellulose, polyester, acrylic resin, or combinations thereof, as a main ingredient. When the spacer includes polyolefin, polyurethane, polyethersulfone, polyvinyl alcohol, cellulose, polyester, acrylic resin, or combinations thereof, as a main ingredient, the wettability of the spacer with the potting agent can be further increased. Therefore, the adhesiveness of the hollow fiber membranes and the leakage-preventing effect in the hollow fiber membrane module can be further improved.

Details of Embodiments of Present Disclosure

Hereinafter, a method for manufacturing a hollow fiber membrane module and a hollow fiber membrane module according to each embodiment of the present disclosure will be described in detail with reference to the drawings.
<Method for Manufacturing Hollow Fiber Membrane Module>

First Embodiment

A method for manufacturing a hollow fiber membrane module according to the first embodiment is a method for manufacturing a hollow fiber membrane module, the hollow fiber membrane module including: a hollow fiber membrane bundle including a plurality of hollow fiber membranes; a housing configured to contain the hollow fiber membrane bundle; and a potting part in which a potting agent is added between an outer surface of the hollow fiber membranes and an inner surface of the housing at both end regions or at one end region of the hollow fiber membrane bundle. The hollow fiber membrane module produced by the method for manufacturing the hollow fiber membrane module is used for a variety of membrane separation applications, such as filtration, degassing, and the like.

FIG. 1 illustrates, as an example of a hollow fiber membrane module manufactured by the method for manufacturing a hollow fiber membrane module according to the first embodiment, a hollow fiber membrane module 3 used for degassing that includes a potting part in which the potting agent is added in both end regions of the hollow fiber membrane bundle. The hollow fiber membrane module 3 includes a membrane member 2 having a hollow fiber membrane bundle 30. The hollow fiber membrane bundle 30 has a plurality of hollow fiber membranes 1 that are aligned in one direction. The membrane member 2 further includes the hollow fiber membrane bundle 30, a first potting part 4 for fixing one end region of the hollow fiber membranes 1, and a second potting part 5 for fixing the other end region of the hollow fiber membranes 1.

The hollow fiber membrane module 3 includes a cylindrical housing 11 for storing the membrane member 2 having a plurality of hollow fiber membranes 1. The hollow fiber membrane module 3 is a one in which a liquid is permeated through the hollow fiber membranes 1 to degas the gas dissolved in the liquid. The hollow fiber membrane module 3 may be configured to include: the cylindrical housing 11; a first sleeve 12 mounted to one end of the housing 11 and provided with an engagement structure in which a gas nozzle 9 and the first potting part 4 engage; a first cap 13 provided with a liquid discharge port 8 enclosing an end of the first sleeve 12 opposite to the housing 11; a second sleeve 14 mounted to the other end of the housing 11; and a second cap 15 provided with a liquid supply port 7 enclosing an end of the second sleeve 14 opposite to the housing 11.

The hollow fiber membrane module 3 includes a liquid supply port 7 on the end face of one end from which a solution to be processed is supplied, and a liquid discharge port 8 on the end face of the other end to discharge liquid that has permeated through the hollow fiber membranes 1. A gas nozzle 9 is provided at the side of the housing 11. The solution to be processed that has been supplied from the liquid supply port 7 into the second cap 15 permeates through the hollow fiber membrane 1 and is supplied into the housing 11. The liquid that has permeated through the hollow fiber membrane 1 is discharged from the liquid discharge port 8 provided at the side near the other end of the housing 11. The outside of the hollow fiber membrane 1 is depressurized by suctioning from the gas nozzle 9 by a vacuum pump (not illustrated). The gas dissolved in the liquid passing through the hollow fiber membrane 1 is suctioned from the wall surface of the hollow fiber membrane 1 toward the gas nozzle 9 and is discharged from the tip of the gas nozzle 9.

(Housing)

Examples of the material of the housing 11 of the hollow fiber membrane module 3 include resins such as a copolymer of ethylene and α-olefin; a polyethylene (PE) based resin such as low density polyethylene and high density polyethylene; a polypropylene (PP) based resin such as a polymer of propylene alone, a copolymer of propylene and ethylene, or a copolymer of propylene and ethylene and other α-olefin; an epoxy resin, PTFE (polytetrafluoroethylene), polyvinyl chloride, polyester, polycarbonate, polystyrene, a styrene-butadiene copolymer (SBS), acrylonitrile-butadiene-styrene copolymer (ABS), and the like, which may be used alone or as a mixture. In addition, examples of the material include metals such as iron, stainless steel, aluminum, and the like.

(Hollow Fiber Membrane)

Figure 2:
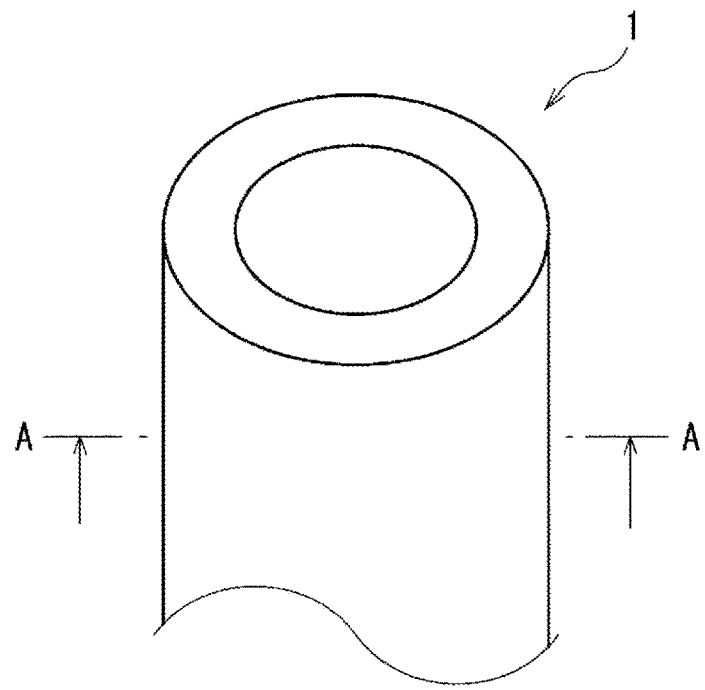
FIG. 2 is a schematic perspective view illustrating a hollow fiber membrane according to the first embodiment.
Figure 3:
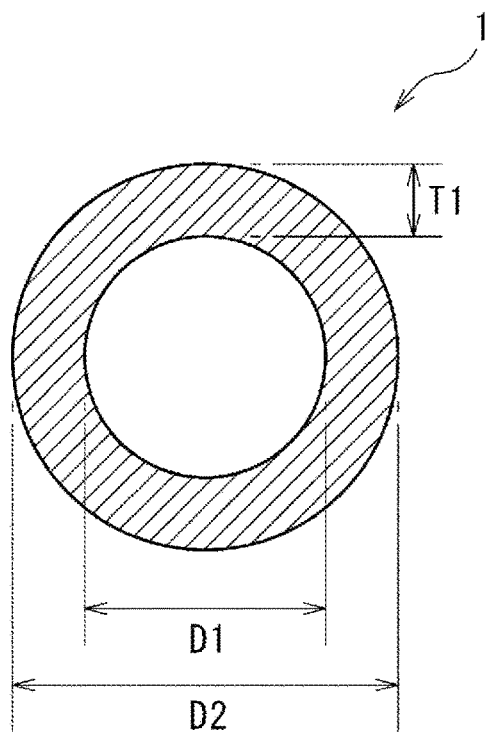
FIG. 3 is a cross-sectional view of the A-A line of the hollow fiber membrane of FIG. 2.

The hollow fiber membrane 1 illustrated in FIGS. 2 and 3 is used as a separation membrane. Material, membrane shape, membrane configuration, and the like of the hollow fiber membrane 1 are not particularly limited. For example, a membrane having resin as a main ingredient may be used.

Examples of the resin include polyolefin-based resins such as polyethylene, polypropylene, poly(4-methylpentene-1); silicone-based resins such as polydimethylsiloxane and its copolymer; fluorine-based resins such as polytetrafluoroethylene, modified polytetrafluoroethylene, polyvinylidene fluoride; ethylene-vinyl alcohol copolymer, polyamide, Polyimide, polyetherimide, polystyrene, polysulfone, polyvinyl alcohol, polyphenylene ether, polyphenylene sulfide, cellulose acetate, polyacrylonitrile, and the like. Among these, PTFE is preferable, which is excellent in mechanical strength, chemical resistance, heat resistance, weather resistance, non-flammability, and the like, and which is porous. The hollow fiber membrane 1 can be obtained, for example, by forming particles of PTFE or modified PTFE into a tube shape and then stretching the particles to make them porous.

In addition to the resin as the main ingredient, the hollow fiber membrane 1 may contain other resins or additives as long as the desired effect of the present disclosure is not impaired. Examples of the additives include pigments for coloring; inorganic fillers for improving abrasion resistance, preventing low temperature flow, and facilitating hole formation; metal powders, metal oxide powders, metal sulfide powders, lubricants, and the like.

The lower limit of the average outer diameter D2 of the hollow fiber membrane 1 is not particularly limited, and is preferably 0.1 mm, and more preferably 0.2 mm. The upper limit of the average outer diameter D2 of the hollow fiber membrane 1 is 1.0 mm, and preferably 0.75 mm. When the average outer diameter D2 is less than the lower limit, the pressure loss may increase. When the average outer diameter D2 exceeds the upper limit, the membrane area in the housing of the module may become reduced, or the pressure resistance may become reduced and bursting due to internal pressure or buckling due to external pressure may occur. The term "average outer diameter" means the average of two freely-selected outer diameters.

The lower limit of the average inner diameter D1 of the hollow fiber membrane 1 is not particularly limited, and is preferably 0.05 mm, and more preferably 0.1 mm. The upper limit of the average inner diameter D1 of the hollow fiber membrane 1 is 0.5 mm, and preferably 0.3 mm. When the average inner diameter D1 is less than the lower limit, the pressure loss may increase. When the average inner diameter D1 exceeds the upper limit, the pressure resistance may become reduced and bursting due to internal pressure or buckling due to external pressure may occur. The term "average inner diameter" means the average of two freely-selected inner diameters.

The lower limit of the average thickness T1 of the hollow fiber membrane 1 is preferably 0.025 mm, and more preferably 0.05 mm. The upper limit of the average thickness T1 of the hollow fiber membrane 1 is 0.5 mm, and preferably 0.3 mm. when the average thickness T1 is less than the lower limit, the pressure resistance may become reduced and bursting due to internal pressure or buckling due to external pressure may occur. When the average thickness T1 exceeds the upper limit, the gas permeability may become reduced. The term "average thickness" means the average of 10 freely-selected thicknesses.

The hollow fiber membrane bundle 30 is a bundle of a plurality of hollow fiber membranes, and is contained in the housing 11 along the longitudinal direction.

(Potting Part)

The first potting part 4 and the second potting part 5 are made of the potting agent. The potting agent is added between the outer surface of the hollow fiber membranes 1 and the inner surface of the housing 11 at both end regions of the hollow fiber membrane bundle 30. More specifically, in the first potting part 4 and the second potting part 5, the both end regions of the hollow fiber membrane bundle 30 are embedded, and the hollow fiber membrane bundle 30 is fixed to the inner surface of the housing 11, at the both end regions of the hollow fiber membrane bundle 30. In the first potting part 4 and the second potting part 5, the outer peripheral part is a part composed only of the potting agent, and the inside thereof is a part in which the potting agent has entered the space between the hollow fiber membranes 1 of the hollow fiber membrane bundle 30. Spacers 20 for the potting agent to enter the space between the hollow fiber membranes 1 are provided in the first potting part 4 and the second potting part 5, as will be described later. The first potting part 4 and the second potting part 5 respectively fix each of the end regions of the hollow fiber membrane bundle 30, so that the hollow fiber membranes 1 are aligned in one direction without entangling each other.

The potting agent includes resin, rubber, or elastomer, as a main ingredient. Examples of the potting agent include, but are not limited to, epoxy resin, urethane resin, ultraviolet curable resin, fluorine-containing resin, silicon resin, polyolefin resin such as polyamide resin, polyethylene, and polypropylene. Among these, epoxy resin and urethane resin are more preferred because of their performance as adhesives.

As illustrated in FIG. 1, in the first potting part 4 and the second potting part 5, the potting agent is not added inside the hollow fiber membrane 1, but is added only on the outer surface of the hollow fiber membranes 1 and between the hollow fiber membrane bundle 30 and the inner wall of the housing 11. That is, the hollow fiber membrane bundle 30 is fixed to the inner wall of the housing 11 with the hollow fiber membrane 1 being in an open state.

Hereinafter, each process of the method for manufacturing the hollow fiber membrane module according to the first embodiment will be described in detail.

The method for manufacturing the hollow fiber membrane module includes: providing a sheet-shaped spacer in a space between the hollow fiber membranes; and adding a potting agent between the outer surface of the hollow fiber membranes and the inner surface of the housing at both end regions or at one end region of the hollow fiber membrane bundle such that the provided spacer is embedded. The method for manufacturing the hollow fiber membrane module may further include cutting a portion of the potting Part.

(Process of Providing Spacer)

In the present process, the spacer for the potting agent to enter the space between the hollow fiber membranes 1 is provided in the space between the hollow fiber membranes at both end regions of the hollow fiber membrane bundle. In the first embodiment, the sheet-shaped spacer is band-formed.

In the first embodiment, preferably, the present process includes: arranging a plurality of hollow fiber membranes in parallel while holding only both end regions or one end region of the hollow fiber membranes on one side of the spacer; and forming a roll-shaped hollow fiber membrane bundle by rolling the hollow fiber membranes and the spacer that is provided at the both end regions or at the one end region of the hollow fiber membranes.

Figure 4:
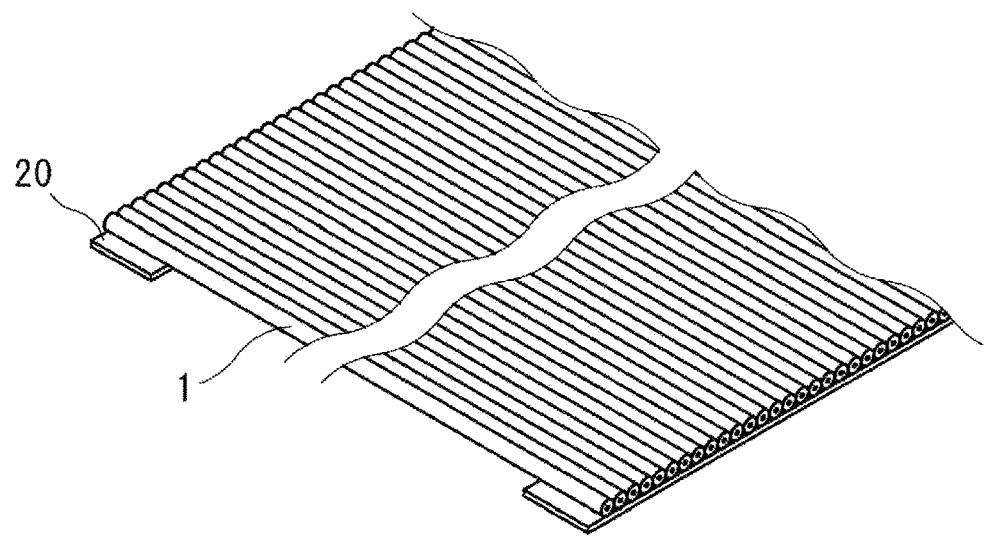
FIG. 4 is a schematic perspective view of hollow fiber membranes and spacers for explaining a method for manufacturing a hollow fiber membrane module according to the first embodiment.

FIG. 4 is a schematic perspective view for explaining an example of the method for manufacturing the hollow fiber membrane module according to the first embodiment. First, as illustrated in FIG. 4, end regions of the hollow fiber membranes 1 are arranged in parallel on one side of the spacer 20 for the potting agent to enter the space between the hollow fiber membranes 1. Specifically, the hollow fiber membranes 1 are arranged in parallel on one side of each of the two spacers 20 arranged in parallel, while holding both end regions of the hollow fiber membranes 1 aligned in one direction.

A lower limit of the surface free energy of the spacer 20 is preferably 30 mJ/m$^2$, and more preferably 35 J/m$^2$. The upper limit of the surface free energy is preferably 50 mJ/m$^2$, and more preferably 45 J/m$^2$. When the surface free energy is less than the lower limit, the potting agent may not be sufficiently induced. When the surface free energy exceeds the upper limit, because the spacer absorbs moisture in the atmosphere and mixes the moisture with the potting agent, curing of the potting agent may be prevented so that sufficient strength and sealability may not be obtained, or because the spacer swells in the fluid in use, the potting agent may become cracked so that sufficient sealability may not be obtained. When the surface free energy of the spacer is 30 mJ/m$^2$ or more and 50 mJ/m$^2$ or less, good wettability can be obtained with the potting agent including resin, rubber, or elastomer, as a main ingredient. Accordingly, the spacer having good wettability with the potting agent is provided in a space between the hollow fiber membranes at both end regions or at one end region of the hollow fiber membrane bundle. Therefore, the potting agent can be sufficiently spread in the space between the hollow fiber membranes of the hollow fiber membrane bundle by capillary action by the spacer.

The surface free energy is obtained by the following method.

The contact angle θ of four types of liquids having different surface tensions γL was measured at room temperature of 25° C., and the γL value at which cos θ=1 was defined as the solid surface free energy λc[mJ/m$^2$] by Zisman plot of cos θ versus γL. The surface tension γL of water is 73 [mN/m], the surface tension γL of ethanol is 22 [mN/m], the surface tension γL of hexadecane is 63 [mN/m], and the surface tension γL of glycerin is 28 [mN/m]. The surface tension [mN/m] and the surface free energy [mJ/m$^2$] are equivalent and equal to each other.

The spacer 20 is a net, a non-woven fabric, a porous sheet, or a film. Because the spacer is a net, a non-woven fabric, a porous sheet, or a film, the fluid can easily flow along the spacer. Therefore, the adhesiveness of the hollow fiber membranes and the leakage-preventing effect in the hollow fiber membrane module can be further improved. The term "non-woven fabric" means a material manufactured by hanging and stacking a single piece of fiber formed by melt extrusion and the like and then press-fusing it. The term "porous sheet" means a material manufactured by foaming or stretching a film.

The spacer 20 preferably includes polyolefin, polyurethane, polyethersulfone, polyvinyl alcohol, cellulose, polyester, acrylic resin, or combinations thereof, as a main ingredient. When the spacer includes polyolefin, polyurethane, polyethersulfone, polyvinyl alcohol, cellulose, polyester, acrylic resin, or combinations thereof, as a main ingredient, the wettability of the spacer with the potting agent can be further improved. Therefore, the adhesiveness of the hollow fiber membranes and the leakage-preventing effect in the hollow fiber membrane module can be further improved.

The lower limit of the ratio of the thickness of the spacer to the average outer diameter of the hollow fiber membrane is preferably 0.1, and more preferably 0.2. The upper limit of the ratio of the thickness of the spacer is preferably 1.0, and more preferably 0.5. When the ratio of the thickness is less than the lower limit, the stiffness (hardness) becomes low and the function of aligning and retaining the hollow fiber membranes may become impaired. When the ratio of the thickness exceeds the upper limit, the stiffness (hardness) becomes high and the hollow fiber membrane may collapse. When the ratio of the thickness of the spacer to the average outer diameter of the hollow fiber membrane is within the range described above, the wettability of the spacer with the potting agent can be further improved. Therefore, the adhesiveness of the hollow fiber membranes and the leakage-preventing effect in the hollow fiber membrane module can be further improved.

Figure 5:
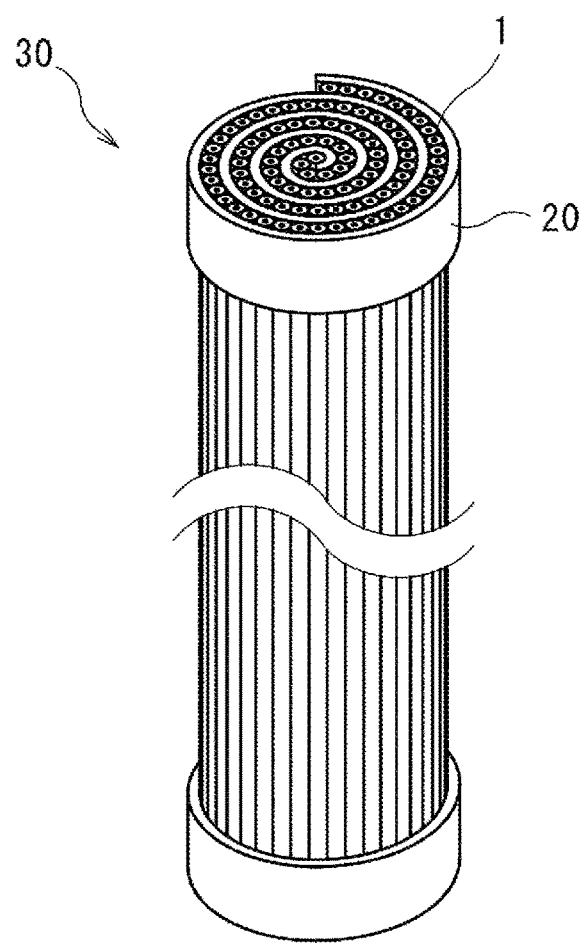
FIG. 5 is a schematic perspective view illustrating a method for manufacturing a hollow fiber membrane module according to the first embodiment.

Next, as illustrated in FIG. 5, a roll-shaped hollow fiber membrane bundle 30 is formed by rolling the hollow fiber membranes 1 and the spacer 20, which is provided at both end regions of the hollow fiber membranes 1. As described above, in the first embodiment, a plurality of hollow fiber membranes 1 are rolled with spacers 20 therebetween at the both end regions to form the roll-shaped hollow fiber membrane bundle 30.

(Process of Adding Potting Agent)

After the process of providing, in the present process, the potting agent is added on the outer surface of the hollow fiber membranes 1 and between the hollow fiber membranes 1 and the inner surface of the housing 11 at both end regions or at one end region of the hollow fiber membrane bundle 30 such that the provided spacer 20 is embedded. In the first embodiment, the both end regions of the rolled hollow fiber membrane bundle 30 are fixed in the housing 11 by the potting agent such that the spacer 20 is embedded.

Examples of the method for fixing the both end regions of the hollow fiber membrane bundle 30 with the potting agent include a static potting method in which a resin is injected from below the hollow fiber membrane bundle. The static potting is a method in which a liquid uncured resin is naturally flowed by means of a metering pump or the own weight of the resin and permeated through the hollow fiber membranes. Specifically, the both end regions of the hollow fiber membrane bundle 30 provided at an opening in the housing 11 are inserted into a potting cup injected with a molten potting agent, and the both end regions of the hollow fiber membrane bundle 30 are immersed in the molten potting agent. The potting agent may be injected into the potting cup using an actuator driven electrically or by fluid pressure. According to the method for manufacturing the hollow fiber membrane module, the space between the end regions of the hollow fiber membranes 1 is immersed in the molten potting agent thereby the molten potting agent is added by capillary action. At this time, because the spacer is provided, filling of the space between the end regions of the hollow fiber membranes 1 by capillary action can be facilitated.

Next, the molten potting agent is left in a state, where the molten potting agent is added in the space between the hollow fiber membranes 1 by capillary action, until the potting agent is cured.

(Process of Cutting)

After the required time elapses, when the potting agent cures, a portion of the potting agent having a predetermined length from the end of the cured region is cut together with the hollow fiber membrane bundle 30, thereby forming the first potting part 4 and the second potting part 5. Thus, it is possible to manufacture the hollow fiber membrane module 3 having a cross-sectional structure as illustrated in FIG. 1, in which both end regions of the hollow fiber membranes 1 are in an open state.

In the method for manufacturing the hollow fiber membrane module according to the first embodiment, a sheet-shaped spacer is provided between the hollow fiber membranes at both end regions or at one end region of the hollow fiber membrane bundle. The potting agent is added between the outer surface of the hollow fiber membranes and the inner surface of the housing at the both end regions or at the one end region of the hollow fiber membrane bundle such that the provided spacer is embedded. Because the spacer is a net, a non-woven fabric, a porous sheet, or a film, the potting agent can easily flow along the spacer. Therefore, the adhesiveness of the hollow fiber membranes and the leakage-preventing effect in the hollow fiber membrane module can be further improved. Further, in the method for manufacturing the hollow fiber membrane module according to the first embodiment, a plurality of hollow fiber membranes are arranged in parallel while holding both end regions of the hollow fiber membranes on one side of the band-formed spacer, and a roll-shaped hollow fiber membrane bundle is formed by rolling the hollow fiber membranes and the spacer that is provided at the both end regions of the hollow fiber membranes. Accordingly, because the spacer having good wettability with the potting agent is inserted into the roll-shaped hollow fiber membrane bundle, the potting agent can be sufficiently spread in the space between the hollow fiber membranes of the hollow fiber membrane bundle by capillary action of the spacer. Therefore, it is possible to obtain a hollow fiber membrane module having excellent adhesiveness of hollow fiber membranes filled to a high density and an excellent leakage-preventing effect.

Second Embodiment

A method for manufacturing a hollow fiber membrane module according to the second embodiment is, as in the first embodiment, a method for manufacturing a hollow fiber membrane module including: a hollow fiber membrane bundle including a plurality of hollow fiber membranes; a housing configured to contain the hollow fiber membrane bundle; and a potting part in which a potting agent is added between an outer surface of the hollow fiber membranes and an inner surface of the housing at both end regions or at one end region of the hollow fiber membrane bundle. In the method for manufacturing the hollow fiber membrane module according to the second embodiment, a sheet-shaped spacer having a shape different from that of the method for manufacturing the hollow fiber membrane module according to the first embodiment is provided in the space between the hollow fiber membranes at the both end regions or at the one end region of the hollow fiber membrane bundle. The method for manufacturing a hollow fiber membrane module according to the second embodiment, similar to the first embodiment, includes: providing a spacer in a space between the hollow fiber membranes; and adding a potting agent between the outer surface of the hollow fiber membranes and the inner surface of the housing at both end regions or at one end region of the hollow fiber membrane bundle such that the provided spacer is embedded. The method for manufacturing the hollow fiber membrane module according to the second embodiment may include the process of cutting, as in the first embodiment. Regarding the process of the method for manufacturing the hollow fiber membrane module according to the second embodiment, the process overlapping the first embodiment is omitted.
(Process of Providing Spacer)

Figure 6:
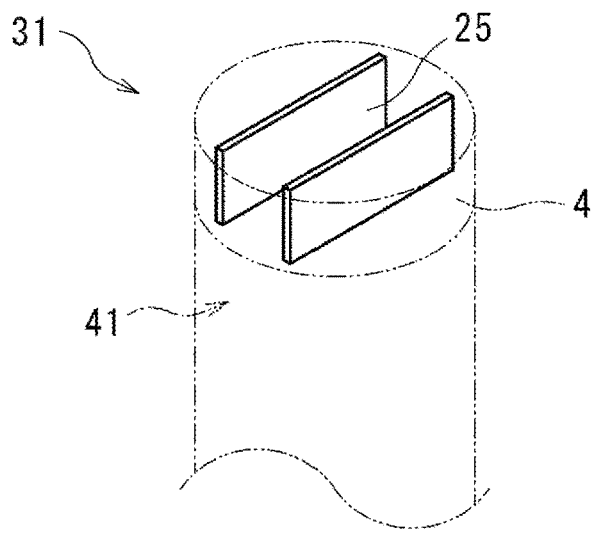
FIG. 6 is a schematic perspective view of a spacer according to another embodiment.
Figure 7:
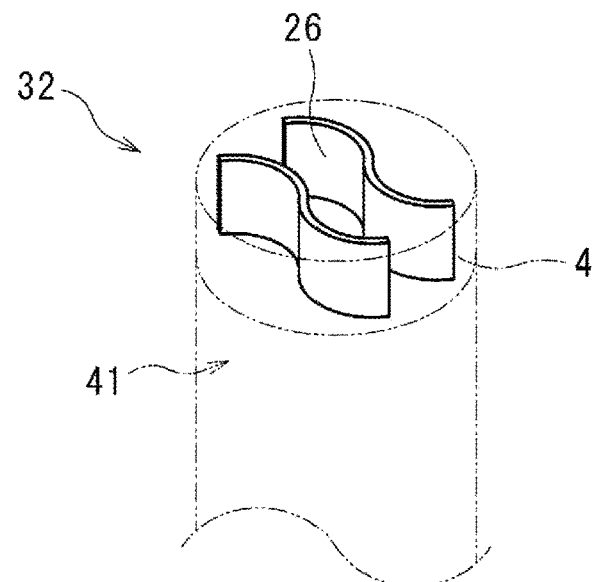
FIG. 7 is a schematic perspective view of a spacer according to another embodiment.
Figure 8:
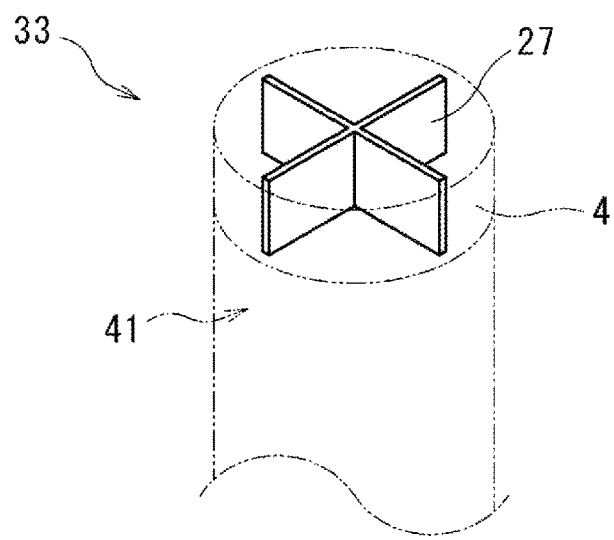
FIG. 8 is a schematic perspective view of a spacer according to another embodiment.

In the present process, the sheet-shaped spacer for the potting agent to enter the space between the hollow fiber membranes 1 is provided in the space between the hollow fiber membranes at both end regions or at one end region of the hollow fiber membrane bundle. In the method for manufacturing the hollow fiber membrane module according to the second embodiment, a spacer having a shape different from that of the spacer as described above in the first embodiment is inserted into a space between the hollow fiber membranes at both end regions or at one end region of the hollow fiber membrane bundle. FIGS. 6, 7, and 8 are schematic perspective views illustrating examples of sheet-shaped spacers according to the second embodiment. In a membrane member 31 illustrated in FIG. 6, plate-shaped spacers 25 are inserted into a space of the hollow fiber membrane 1 at one end of a hollow fiber membrane bundle 41. In a membrane member 32 illustrated in FIG. 7, wave-shaped spacers 26 are inserted into a space of the hollow fiber membrane 1 at one end of the hollow fiber membrane bundle 41. Further, in a membrane member 33 illustrated in FIG. 8, a sheet-shaped spacer 27 is inserted into a space of the hollow fiber membrane 1 at one end of the hollow fiber membrane bundle 41 such that the sheet-shaped spacer 27 is in a cross shape in a planar view.
(Process of Adding Potting Agent)

In the present process, the potting agent is added between the outer surface of the hollow fiber membranes and the inner surface of the housing at both end regions or at one end region of the hollow fiber membrane bundle such that the provided spacer is embedded. Thus, the provided spacer is embedded, and the both end regions or the one end region of the hollow fiber membrane bundle is fixed in the housing with the potting agent.

When the potting agent cures, the process of cutting is performed in the same manner as in the first embodiment, and the hollow fiber membrane module in which both end regions of the hollow fiber membranes 1 are in an open state can be manufactured. As illustrated in FIG. 6, in the first potting part 4 at one end of the membrane member 31, the spacer 25 is embedded by the potting agent. As illustrated in FIG. 7, in the first potting part 4 of the membrane member 32, the spacer 26 is embedded by the potting agent. As illustrated in FIG. 8, in the first potting part 4 of the membrane member 33, the spacer 27 is embedded by the potting agent. The shape of the sheet-shaped spacer used in the method for manufacturing the hollow fiber membrane module according to the second embodiment is not limited thereto, and various shapes may be adopted as long as the shape is such that the effect of the method for manufacturing the hollow fiber membrane module is exhibited.

In the method for manufacturing the hollow fiber membrane module according to the second embodiment, as in the first embodiment, the sheet-shaped spacer is provided in the space between the hollow fiber membrane at both end regions or at one end region of the hollow fiber membrane bundle. The potting agent is added between the outer surface of the hollow fiber membranes and the inner surface of the housing at the both end regions or at the one end region of the hollow fiber membrane bundle such that the provided spacer is embedded. Because the spacer is a net, a non-woven fabric, a porous sheet, or a film, the potting agent can easily flow along the spacer. Accordingly, the adhesiveness of the hollow fiber membranes and the leakage-preventing effect of the hollow fiber membrane module can be further improved. Therefore, a hollow fiber membrane module having excellent adhesiveness of hollow fiber membranes filled to a high density and an excellent leakage-preventing effect, can be obtained.

A method of bundling hollow fiber membrane tubes with wefts is known, for example, as the bamboo screen roll described in Japanese Laid-Open Patent Publication No. S62-155852, without using the spacer. In the method, the flow of fluid may become impaired around the weft in the hollow fiber membrane. Also, in the method of bundling hollow fiber membrane tubes with wefts, the weft itself may deform the hollow fiber membrane. While the weft needs to be thin and strong, it needs to be of a soft material so that the hollow fiber membrane does not collapse. Therefore, the materials that can be used as the weft are limited. For example, it is difficult to adopt polyurethane and the like, which is chemically unstable and may become decomposed and eluted. In the method for manufacturing the hollow fiber membrane module according to the second embodiment, because the roll-shaped hollow fiber membrane bundle is formed while holding only both end regions or one end region of the hollow fiber membranes, the problem as described above does not occur.

Accordingly, by the method for manufacturing the hollow fiber membrane module, a hollow fiber membrane module having excellent adhesiveness of hollow fiber membranes filled to a high density and an excellent leakage-preventing effect, can be produced.

<Hollow Fiber Membrane Module>

A hollow fiber membrane module according to another aspect of the present disclosure is a hollow fiber membrane module for membrane separation. The hollow fiber membrane module includes: a hollow fiber membrane bundle including a plurality of hollow fiber membranes; a housing configured to contain the hollow fiber membrane bundle; a potting part in which a potting agent is added between an outer surface of the hollow fiber membranes and an inner surface of the housing at both end regions or at one end region of the hollow fiber membrane bundle; and a sheet-shaped spacer provided in a space between the hollow fiber membranes at the both end regions or at the one end region of the hollow fiber membrane bundle. The potting agent includes resin, rubber, or elastomer, as a main ingredient. The spacer is a net, a non-woven fabric, a porous sheet, or a film. The spacer is embedded in the potting part.

As described above, the main configuration of the hollow fiber membrane module is as described above.

According to the hollow fiber membrane module, a potting part is provided in which a potting agent is added between the outer surface of the hollow fiber membranes and the inner surface of the housing at both end regions or at one end region of the hollow fiber membrane bundle, and a sheet-shaped spacer is embedded in the potting part. Because the spacer is a net, a non-woven fabric, a porous sheet, or a film, the potting agent can easily flow along the spacer. Accordingly, the adhesiveness of the hollow fiber membranes and the leakage-preventing effect of the hollow fiber membrane module can be further improved. Therefore, the hollow fiber membrane module exhibits high leakage-preventing effect of a solution to be processed, and has excellent adhesiveness of hollow fiber membranes filled to a high density and an excellent leakage-preventing effect.

The hollow fiber membrane module can be applied in either type of devices: an integrated type in which the hollow fiber membrane module is provided within an ink jet printer, degassing device, filtration device, and the like; and a replaceable cartridge type in which the housing and the separation membrane are separated and the separation membrane is inserted into the housing for use.

The hollow fiber membrane module is used for various membrane separation applications such as filtration, degassing, and the like. The hollow fiber membrane module differs in the object to be permeable by the hollow fiber membrane depending on the application, such as filtration, degassing, and the like. For example, in the case where the hollow fiber membrane module is used as a filtration module, the hollow fiber membrane is permeable to the solvent in the solution to be processed, while blocking the permeation of impurities having a certain particle size or more in the solution to be processed. In the case where the hollow fiber membrane module is used as a degassing module, the hollow fiber membrane is permeable to either liquid or gas. The hollow fiber membrane module can be applied to applications in any field. For example, the hollow fiber membrane module can be used in various applications including: water treatment applications such as filtration of river water and lake water, filtration of water for nuclear power generation and thermal power generation, condensation filtration, water sterilization, waste water filtration recovery; food filtration; organic solvent filtration and separation; degassing of liquids; and enriching of specific gases by selective permeation of gases such as oxygen, carbon dioxide, nitrogen, hydrogen, and the like.

The hollow fiber membrane module has excellent adhesiveness of hollow fiber membranes filled to a high density and an excellent leakage-preventing effect. Such a hollow fiber membrane module exhibits particularly excellent degassing performance, and is suitably used in semiconductor manufacturing processes, printers, liquid crystal encapsulation processes, chemical liquid manufacturing processes, hydraulic devices, samples of analysis devices, degassing devices for artificial blood vessels, artificial heart-lung machines, and the like.

Other Embodiment

It should be considered that the embodiments disclosed herein are exemplary in all respects and not restrictive. The scope of the present disclosure is not limited to the configuration of the embodiments described above, but is set forth by the appended claims and is intended to include all modifications within the meaning and scope equivalent to the appended claims.

In the embodiment described above, a plurality of straight hollow fiber membranes are bundled to form a hollow fiber membrane bundle, and each of the both end regions of the hollow fiber membrane bundle includes a potting part in which a potting agent is added, but one end region of the hollow fiber membrane bundle may include a potting part in which a potting agent is added. An embodiment in which one end region of the hollow fiber membrane bundle includes a potting part in which a potting agent is added may be as follows. For example, a plurality of hollow fiber membranes are bent in two, a loop-shaped bundle is formed at one end of the hollow fiber membranes in a generally U-shape to form a hollow fiber membrane bundle, and a potting part is provided at an opening of the hollow fiber membrane bundle. In this manner, a hollow fiber membrane module is formed.

In the embodiment described above, the hollow fiber membrane module is a liquid permeable hollow fiber membrane module in which liquid is permeated through the hollow fiber membrane to degas the gas dissolved in the liquid, but the hollow fiber membrane module may be a gas permeable hollow fiber membrane module in which gas is permeated through the hollow fiber membrane to degas the gas dissolved in the liquid.

EXAMPLE

In the following, the present disclosure will be described in more detail by way of examples, but the present invention is not limited to these examples.
<Hollow Fiber Membrane Module Test No. 1 to Test No. 4>

Hollow fiber membrane modules of test No. 1 to test No. 4 were prepared. A PTFE fine powder (0.8 kGy of γ-rays were irradiated to "CD123" manufactured by AGC Inc.) was used as raw material for a hollow fiber membrane bundle.

[Molding Process]

The obtained PTFE powder was formed into a tube shape under the following conditions. As a method for forming into a tube shape, for example, a paste extrusion method or a ram extrusion method described in "Fussojushi Handbook (Fluoropolymer Handbook) (written by Takaomi Satokawa, The Nikkan Kogyo Shimbun, Ltd.)" can be used. In this example, the paste extrusion method was used. 23 parts by mass of a liquid lubricant ("Solvent Naphtha", FUJIFILM Wako Pure Chemical Corporation) were mixed in the PTFE powder. The mixture was compacted into a cylindrical shape using a pre-molding machine, and then formed by extruding into a coiled shape using an extruder. The cylinder and die temperatures were 50° C. Test examples No. 1, 2, 3, and 4 were prepared using an extruder with a cylinder diameter of 40 mm, a mandrel diameter of 10 mm, a die diameter of 1.0 mm, and a core pin diameter of 0.5 mm.

[Drying Process]

In the drying process, the liquid lubricant was dried in a hot air circulation thermostatic chamber at 200° C.

[Sintering Process]

The tube-shaped product was heated by a continuous stretching sintering machine at a furnace temperature of 420° C., which was equal to or higher than the melting point of PTFE or modified PTFE, and sintered at a stretching ratio of 0.9 times to obtain a translucent non-porous tube.

[Slow Cooling Process]

The translucent non-porous tube was placed in the hot air circulation thermostatic chamber in the coiled state and heated at 350° C. for 5 minutes or more, and continuously and slowly cooled at a cooling rate of −1° C./minute or less to 300° C. or less.

[Stretching Process]

In the stretching process, the obtained non-porous tube-shaped product was stretched under the following conditions to obtain a porous tube-shaped product. Using a tensile tester (Autograph AG500 with a thermostatic chamber manufactured by Shimadzu Corporation), 6-fold stretching was performed at a chuck width of 20 mm, stretching speed of 500 mm/min, and 170° C. The average outer diameter and the average inner diameter were measured at two freely-selected points to obtain the average value, and the average thickness was calculated from the formula of (average outer diameter-average inner diameter)/2 at two freely-selected points.

A hollow fiber membrane with a length of 100 mm prepared by the above method was used. The average outer diameter and the average inner diameter of the hollow fiber membranes used in test No. 1 to test No. 4 are illustrated in Table 1.

Next, spacers were placed between the hollow fiber membranes of the hollow fiber membrane bundles. Table 1 illustrates the forms, materials, free energy, thickness, and location of the spacers used in test No. 1 test No. 4.

Next, a hollow fiber bundle rolled in the method illustrated in FIG. 4 (288 hollow fibers) was placed in a cylindrical transparent epoxy resin housing with an inner diameter of 12 mm and 90 mm by inserting the hollow fiber bundle into the housing, whereby a potting agent was added into the hollow fiber membrane bundle such that the spacer was embedded. As the potting agent, an epoxy curing agent "Gaskamine G-240" manufactured by Mitsubishi Gas Chemical Company, Inc. was used as a curing agent, and "jER 811" manufactured by Mitsubishi Chemical Holdings Corporation was used as an epoxy resin base agent. The added amount was adjusted so that the added height was 20 mm from the end of the module housing. After adding and curing, the end of the module housing was cut off by 10 mm. Table 1 illustrates the materials and shapes of the housings used in test No. 1 to test No. 4.

[Evaluation]

For the hollow fiber membrane modules in test No. 1 to test No. 4 described above, leakage evaluation, hollow fiber function evaluation, and cross-sectional observation by CT analysis, were performed.

(Leakage Evaluation)

The leakage evaluation was performed for the hollow fiber membrane modules of test No. 1 to test No. 4 described above, according to the following procedure.

Specifically, the hollow fiber module was applied to water, and evacuating from a gas nozzle using a vacuum pump was performed in a gauge pressure range of −95 to −100 kPa. When water entered the housing, it was determined that leakage has occurred.

(Hollow Fiber Function Evaluation)

The hollow fiber function evaluation was performed for the hollow fiber membrane modules of test No. 1 to test No. 4 described above, according to the following procedure.

Pure water, in which oxygen was dissolved by air bubbling and the dissolved oxygen concentration was adjusted to about 7 ppm, was flowed at a flow rate of 5 ml/min. The pure water was degassed by taking in air from a gas nozzle using a vacuum pump at a gauge pressure of −85 kPa. The dissolved oxygen concentration of the pure water before and after the permeation of the hollow fiber membrane module was measured, and the removal rate of the dissolved oxygen was determined by the following equation.

> removal rate of dissolved oxygen (%)=(dissolved oxygen concentration before permeation−dissolved oxygen concentration after permeation)/dissolved oxygen concentration before permeation The evaluation result was evaluated in two stages, and it was considered good when the dissolved oxygen was removed by 50% or more, and defective when the removal rate was less than 50%.

(Cross-Sectional Observation by CT Analysis)

The cross-sectional observation by CT analysis was performed for the hollow fiber membrane modules of test No. 1 to test No. 4 described above, according to the following procedure. Suctioning of a sealant was evaluated. Specifically, an X-ray non-destructive testing system (SMX-225CT) manufactured by Shimadzu Corporation was used to take an image with a resolution of a voxel size of 66 μm. From the obtained data, the inside of the module was analyzed using myVGL 3.0 manufactured by Volume Graphics, Inc. When suctioning of the sealant was not observed, the adhesiveness of the hollow fiber membrane is good.

Table 1 illustrates the evaluation results of leakage evaluation, hollow fiber function evaluation, and cross-sectional observation by CT analysis, for the hollow fiber membrane modules of test No. 1 to test No. 4.

| HOLLOW FIBER MEMBRANE MODULE TEST NUMBER | HOLLOW FIBER MEMBRANE AVERAGE OUTER DIAMETER [mm] | HOLLOW FIBER MEMBRANE AVERAGE INNER DIAMETER [mm] | SPACER FORM | SPACER MATERIAL | SPACER SURFACE FREE ENERGY [mJ/m$^2$] | SPACER THICKNESS [mm] | SPACER LOCATION |
|---|---|---|---|---|---|---|---|
| No. 1 | 0.50 | 0.25 | NET | PP | 31 | 0.13 | BOTH ENDS 10 mm WIDTH ONLY |
| No. 2 | 0.50 | 0.25 | NON-WOVEN FABRIC | PP/PE COMPOSITE | 31 | 0.05 | BOTH ENDS 10 mm WIDTH ONLY |
| No. 3 | 0.50 | 0.25 | — | — | — | — | — |
| No. 4 | 0.50 | 0.25 | NON-WOVEN FABRIC | PP/PE COMPOSITE | 31 | 0.05 | ENTIRE LENGTH OF HOLLOW FIBER MEMBRANE |

| HOLLOW FIBER MEMBRANE MODULE TEST NUMBER | HOLLOW FIBER MEMBRANE MODULE HOUSING MATERIAL | HOLLOW FIBER MEMBRANE MODULE HOUSING SHAPE | EVALUATION LEAKAGE TEST | EVALUATION HOLLOW FIBER MEMBRANE FUNCTION REMOVAL RATE OF DISSOLVED OXYGEN [%] | EVALUATION HOLLOW FIBER MEMBRANE FUNCTION DETERMINATION | EVALUATION CROSS-SECTIONAL OBSERVATION BY CT ANALYSIS |
|---|---|---|---|---|---|---|
| No. 1 | EPOXY RESIN | CYLINDRICAL | NO LEAKAGE | 77 (1.6 PPM) | GOOD | NO SUCTION |
| No. 2 | EPOXY RESIN | CYLINDRICAL | NO LEAKAGE | 77 (1.6 PPM) | GOOD | NO SUCTION |
| No. 3 | EPOXY RESIN | CYLINDRICAL | LEAKAGE | — | NOT MEASURABLE | NO SUCTION |
| No. 4 | EPOXY RESIN | CYLINDRICAL | NO LEAKAGE | 43 (4.0 PPM) | DEFECTIVE | SUCTION ENTIRELY |

As illustrated in Table 1 described above, the hollow fiber membrane modules of test No. 1 and test No. 2 having spacers at both ends of the hollow fiber membrane bundle gave good results in the leakage evaluation, the hollow fiber function evaluation, and the cross-sectional observation. In contrast, in the hollow fiber membrane module of test No. 3 without spacers, leakage has occurred and the function as a hollow fiber membrane could not be obtained. In the hollow fiber membrane module of test No. 4 in which the spacer is arranged along the entire length of the hollow fiber membrane, the sealant was sucked up over the entire hollow fiber membrane, and the function as a hollow fiber membrane could not be obtained.

As described above, it was shown that by the method for manufacturing the hollow fiber membrane module, a hollow fiber membrane module having excellent adhesiveness and leak preventing effect of the hollow fiber membrane can be manufactured.

DESCRIPTION OF THE REFERENCE NUMERAL

1 Hollow fiber membrane
2, 31, 32, 33 Membrane member
3 Hollow fiber membrane module
4 First potting part
5 Second potting part
7 Liquid supply port
8 Liquid discharge port
9 Gas nozzle
11 Housing
12 First sleeve
13 First cap
14 Second sleeve
15 cap
20, 25, 26, 27 Spacer
30, 41 Hollow fiber membrane bundle

The invention claimed is:
1. A method for manufacturing a hollow fiber membrane module, the hollow fiber membrane module comprising:
   a hollow fiber membrane bundle including a plurality of hollow fiber membranes;
   a housing configured to contain the hollow fiber membrane bundle; and
   a potting part or potting parts in which a potting agent is added between outer surfaces of the hollow fiber membranes and inner surfaces of the housing at one end region or at both end regions of the hollow fiber membrane bundle,
   wherein the method comprises:
   providing a sheet-shaped spacer or spacers in a space between the hollow fiber membranes at the one end region or at the both end regions of the hollow fiber membrane bundle; and
   adding a potting agent between the outer surfaces of the hollow fiber membranes and the inner surfaces of the housing at the both end regions or at the one end region of the hollow fiber membrane bundle such that the provided spacer or spacers are embedded,
   wherein the potting agent includes resin, rubber, or elastomer, as a main ingredient,
   wherein the spacer or spacers are a net, a non-woven fabric, a porous sheet, or a film,
   wherein the spacer or spacers are band-formed, and wherein the providing includes:

arranging the hollow fiber membranes in parallel while holding only the one end region of the hollow fiber membranes or only the both end regions of the hollow fiber membranes, on one side of the spacer or spacers; and forming the hollow fiber membrane bundle as a roll-shaped bundle by rolling the hollow fiber membranes and the spacer or spacers.

2. A hollow fiber membrane module comprising:

a hollow fiber membrane bundle including a plurality of hollow fiber membranes;

a housing configured to contain the hollow fiber membrane bundle;

a potting part or potting parts in which a potting agent is added between outer surfaces of the hollow fiber membranes and inner surfaces of the housing at one end region or at both end regions of the hollow fiber membrane bundle; and a sheet-shaped spacer or spacers provided in a space between the hollow fiber membranes at the one end region or at the both end regions of the hollow fiber membrane bundle, wherein the potting agent includes resin, rubber, or elastomer, as a main ingredient, wherein the spacer or spacers are a net, a non-woven fabric, a porous sheet, or a film, wherein the spacer or spacers are band-formed, and wherein the hollow fiber membrane bundle is formed as a roll-shaped bundle by rolling the hollow fiber membranes and the spacer or spacers.

3. The hollow fiber membrane module according to claim 2, wherein a ratio of a thickness of the spacer or spacers to an average outer diameter of the hollow fiber membranes is 0.1 or more and 1.0 or less.

4. The hollow fiber membrane module according to claim 2, wherein the surface free energy of the spacer or spacers is 30 mJ/m$^2$ or more and 50 mJ/m$^2$ or less.

5. The hollow fiber membrane module according to claim 2, wherein the spacer or spacers include polyolefin, polyurethane, polyethersulfone, polyvinyl alcohol, cellulose, polyester, acrylic resin, or a combination or combinations thereof.

* * * * *